Feb. 8, 1966  C. ROBERT TURNER ETAL  3,233,606
COOKING RANGE HOOD
Filed July 15, 1963  11 Sheets-Sheet 1

INVENTORS.
C. Robert Turner
BY Walter A. Spear
Cleveland F. Meeker
Wood, Herron & Evans.
ATTORNEYS.

Feb. 8, 1966  C. ROBERT TURNER ETAL  3,233,606
COOKING RANGE HOOD
Filed July 15, 1963  11 Sheets-Sheet 11

INVENTORS.
C. Robert Turner
BY Walter A. Spear
Cleveland F. Meeker
Wood, Herron & Evans,
ATTORNEYS.

United States Patent Office 3,233,606
Patented Feb. 8, 1966

3,233,606
COOKING RANGE HOOD
C. Robert Turner, Walter A. Spear, and Cleveland F. Meeker, Cincinnati, Ohio, assignors to Nutone, Inc., Cincinnati, Ohio, a corporation of Delaware
Filed July 15, 1963, Ser. No. 294,826
3 Claims. (Cl. 126—299)

This invention relates to cooking ranges and it is directed in particular to a cooking range comprising, in combination, a burner unit and an oven unit that are adapted to be installed in a kitchen along with standard countertop cabinets to achieve a built-in appearance.

One of the objectives of the invention has been to provide a range of the type set forth that is fully vented by means of a single blower that serves to vent both the area above the burner unit and the inside of the oven.

Another objective of the invention has been to provide a range of the type set forth in which the units may be installed in any one of three relationships, one in which the oven unit is below the burner unit, a second in which the oven unit is to the left of the burner unit and a third in which the oven unit is to the right of the burner unit, with the single blower, in each instance, serving to vent both the inside of the oven and the area above the burner unit.

A further objective of the invention has been to provide a range of the type set forth that is adapted to be sold at a cost that is more comparable to that of an inexpensive, free standing range than to that of a built-in range which generally is considerably higher.

A further objective of the invention has been to provide a fully vented range having an exhaust hood formed as an integral part of the burner unit that is inexpensively and easily converted from ducted to non-ducted operation, the first being one in which grease and odor laden fumes are exhausted through duct-work to the outside atmosphere and the other being one in which cooking greases and odors are filtered from the air and the cleansed air then returned to the kitchen.

A further objective has been to provide a range of the type set forth in which the oven unit is adapted to be vented under one set of conditions, best suited for baking, or vented under a second set of conditions, best suited for closed door broiling, with provision being made to change from one to the other under the control of a simple two-position handle located immediately above the oven door.

Other objectives and advantages of the invention will be readily apparent to those skilled in the art from the following detailed description of the drawings, in which:

FIGURE 3 is an enlarged cross sectional view of the upper part only of the burner unit illustrating the blower positioned to exhaust air vertically upwardly into ductwork for conveying cooking odors and greases from inside the oven and from the area above the burners to the atmosphere.

Figure 1:
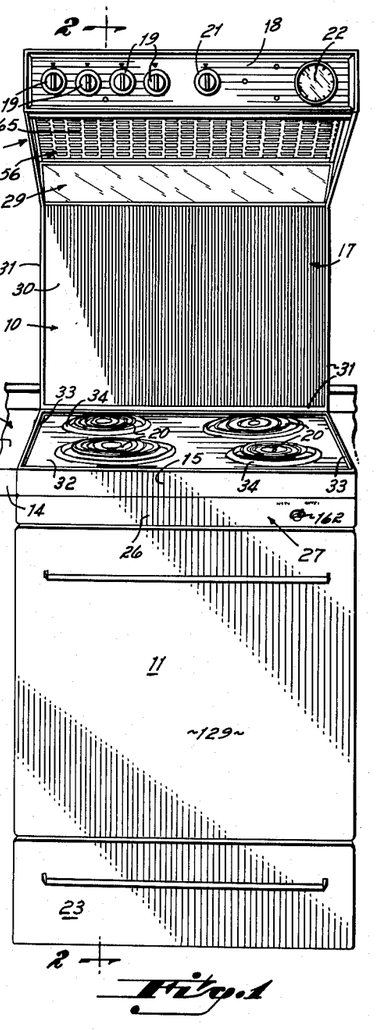
FIGURE 1 is a front perspective view of a cooking range consisting of a burner unit and an oven unit built into countertop cabinets with the burner unit being mounted on top of the oven unit.

Reference is made to FIGURE 1. In this figure, the range consists of a burner unit, designated generally by the numeral 10 and an oven unit, designated generally by the numeral 11. As shown here, the two units are mounted with the burner unit on top of the oven unit. Preferably, as shown, the oven unit 11 is just as tall as a kitchen cabinet, shown fragmentarily only at 12, not including the top of the cabinet which is designated 13. It is also preferred that the cabinet top 13 have a front edge 14 that is just as high as the front edge 15 of the burner unit 10, this arrangement giving the range a built-in appearance even though it is not physically fastened to either the wall or floor of the kitchen in which it is installed.

Figure 20:
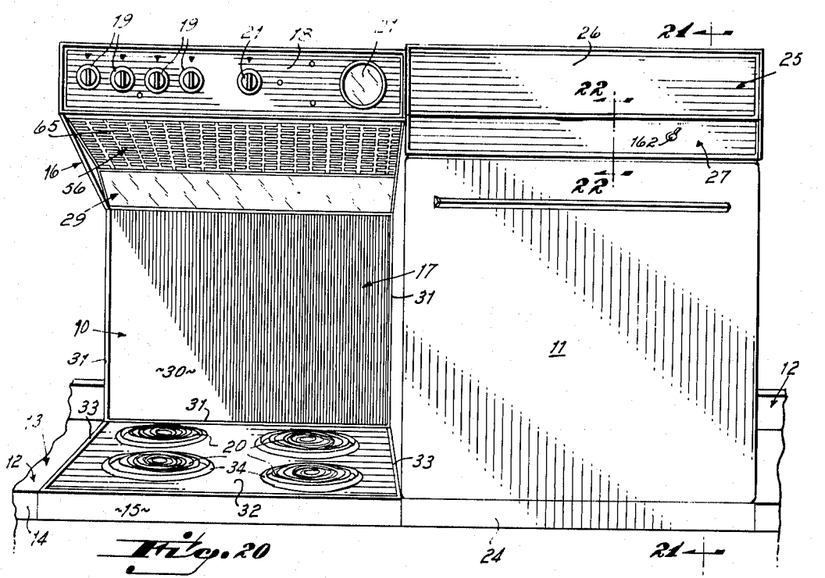
FIGURE 20 is a front perspective view of the range with the oven installed to the right of the burner unit.

Reference is now made to FIGURE 20 which shows another arrangement of the two basic units 10 and 11. In this instance, the burner unit 10 is shown mounted directly on top of the kitchen cabinet 12 in a section thereof wherein the top 13 has been removed. In this instance, the oven unit 11 is shown mounted upon the kitchen cabinet to the right of the burner unit, also in a section of the cabinet wherein the top 13 has been removed. The relationship of FIGURE 20 can be reversed such that the oven 11 is to the left of the burner unit as will be explained, and as in the case of the arrangement shown in FIGURE 1, a built-in appearance is achieved and it is not necessary that either the burner unit or the oven unit be physically fastened to the wall or to the cabinetry upon which they rest, the weight of the units, augmented by the abutting edges of the countertop 13 at their sides, being sufficient to hold them in place. Of course, if desired fasteners may be provided in all three types of installations.

Continuing the general reference to FIGURES 1 and 20, it will be observed that the overall height of the oven unit, in each instance, is equaled to that of the burner unit including the hood portion thereof, which is designated generally by the numeral 16 throughout all of the figures. The hood portion of the burner unit is supported in cantilever fashion from a back structure, indicated generally by the numeral 17. For the safety of small children and as a matter of convenience for adults all of the controls for the burner unit and for the oven unit are mounted at eye level on a control panel, designated generally 18, which forms the front wall of hood 16. These controls may include switches operated by four knobs 19 arranged to control the heat at the four burners 20, a control knob 21 for the oven heating means, and, if desired, a timer clock 22 for the oven. Other controls of a conventional nature may be mounted upon control panel 18 in addition to those shown.

As may be seen from a comparison of FIGURES 1 and 20, the specific construction of the oven unit may vary from one type of installation to the other. In FIGURE 1, a storage drawer 23, of conventional construction, may be installed beneath the oven itself. This same type of arrangement may be used in an installation of the type shown in FIGURE 20. However, it is believed that this places the oven at too high a level for the average housewife, and for this reason in the type installation in FIGURE 20, the oven itself preferably is dropped, relatively speaking, and the space occupied by drawer 23 divided between a filler 24 at the bottom, which corresponds in height to the front 14 of cabinet top 13, and an area 25 at the top which may be dead space, or which may be used for storage or as a warming oven. In these latter instances, a hinge front panel 26 is provided for this area. In both instances, however, a section 27 which is immediately above the oven itself provides an area through which a comparatively small volume of ventilating air may pass when the range is being used for baking, or through which a much greater volume of air may pass to carry away grease, steam and odor laden fumes, when the oven is being used for closed-door broiling. In either instance, a single blower, designated generally by the numeral 28, mounted within hood 16, is adapted to vent the oven and the area above the burners.

The burner unit

This unit, designated generally by the numeral 19, includes three sections. The lower section, which is the cooking area of the range includes the four burners indicated at 20. The mid-section comprises the back structure 17, and the upper section includes the hood 16 plus the control panel 18 and its associated parts. This upper section also includes a source of illumination designated generally by the numeral 29, which in the instance shown extends across the range between the hood and the back structure. The back structure includes, and is covered at the front by a splash panel 30 which preferably is formed from stainless steel having beaded side and bottom edges indicated at 31. The lower part of the burner unit in which the burners themselves are mounted is enclosed within a deck 32 having a beaded edge 33 plus depending flanges at the sides and front, the latter forming the front edge 15 of the burner unit. The deck 32 is open surrounding burners 20 and the edges of these openings preferably are beaded as at 34. A rectangular pan 35 is secured to the underside of deck 32 and this assembly is strengthened by a frame designated generally 36 which surrounds pan 35 and which is secured to the underside of deck 32 as by welding or other fastening means. The framework is made up of right angular frame members which collectively form a rectangular opening of a size and configuration to rest, in the embodiment shown in FIGURE 20 upon structural members of cabinetry or in the embodiment shown in FIGURES 1 and 12 to rest upon mating frame members for the oven. Commercially available burner units may be employed and if desired one of these may have a temperature sensing device associated with it, this device being subject to the control of a timer or a thermostat mounted within the control panel 18. Although the wiring to these burners is not shown it is recomended, for reasons to be later explained, that it extend along the outer side edges of the lower part of the burner unit.

Figure 2:
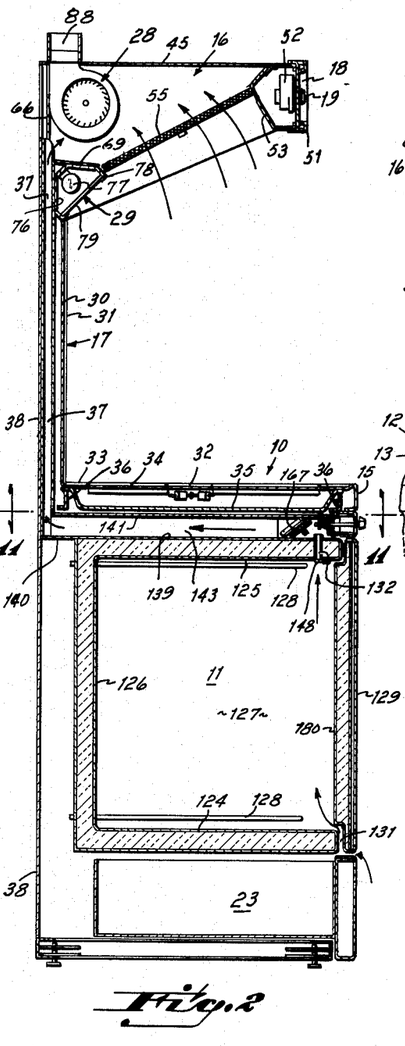
FIGURE 2 is a cross sectional view taken on the line 2—2 of FIGURE 1.

Structural frame members, not shown, may extend vertically through the back structure up into the hood area of the burner unit in order to support the hood in cantilever fashion. The structural members may follow the conventional practices of range constructions but it is preferred that they be at the two sides of the range as it appears in FIGURE 1 such that there is no interference from these frame members to the wiring of the controls, to the blower or to wiring and ventilation ductwork that is located within the back structure and adapted to service the electrical and ventilation systems of the range. More specifically, the back structure encloses a duct 37 that is rectangular in cross section and that extends from a position below the burner unit to a position up into the hood 16 to convey fumes, etc. from the oven up into an area inside of the hood where it may be discharged to the outside atmosphere, or as will be explained, through a non-ducted filter system for return to the kitchen. This duct 37, wiring, etc. at the rear of the range is enclosed and hidden from view by means of a cover panel 38, which in the embodiment of FIGURES 1 and 2 is continuous covering the back of the oven as well as the back of the burner unit including the hood.

Figure 4:
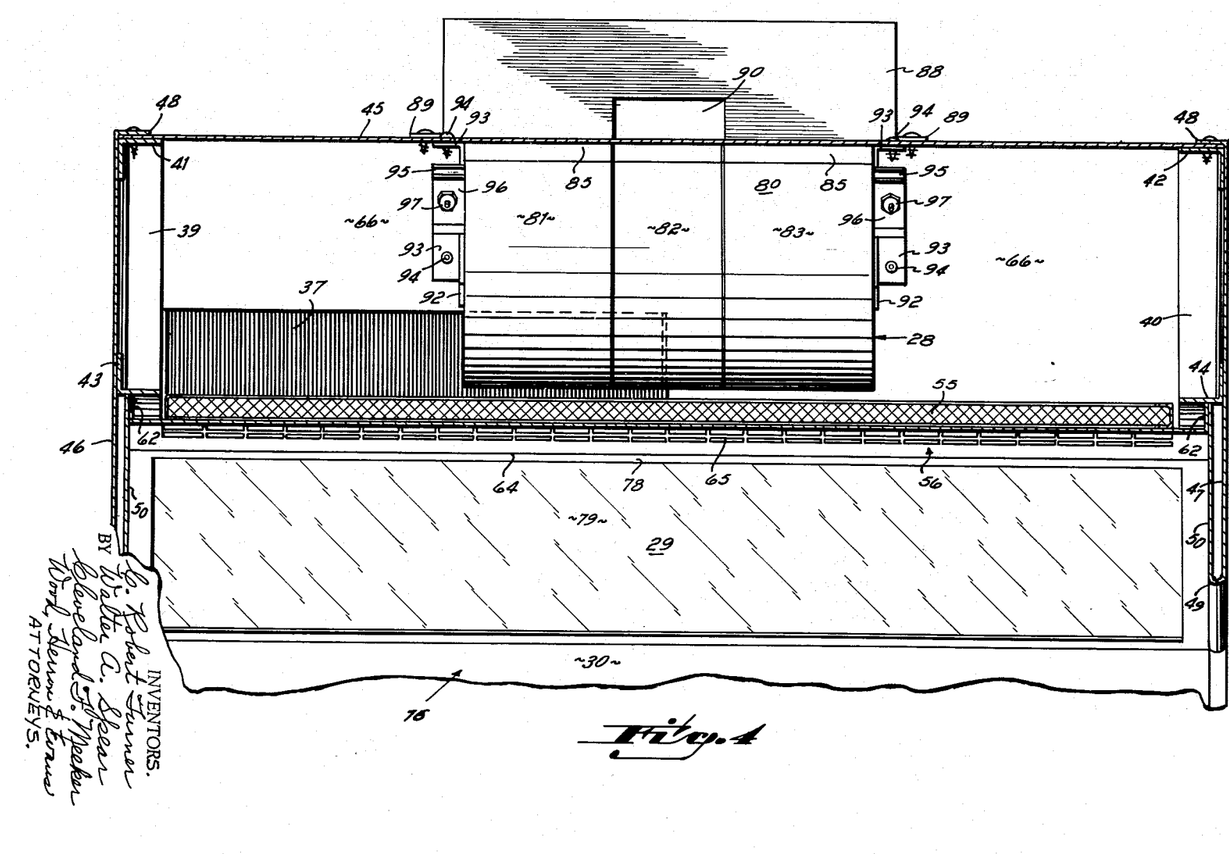
FIGURE 4 is a fragmentary cross sectional view taken on the line 4—4 of FIGURE 3.
Figure 5:
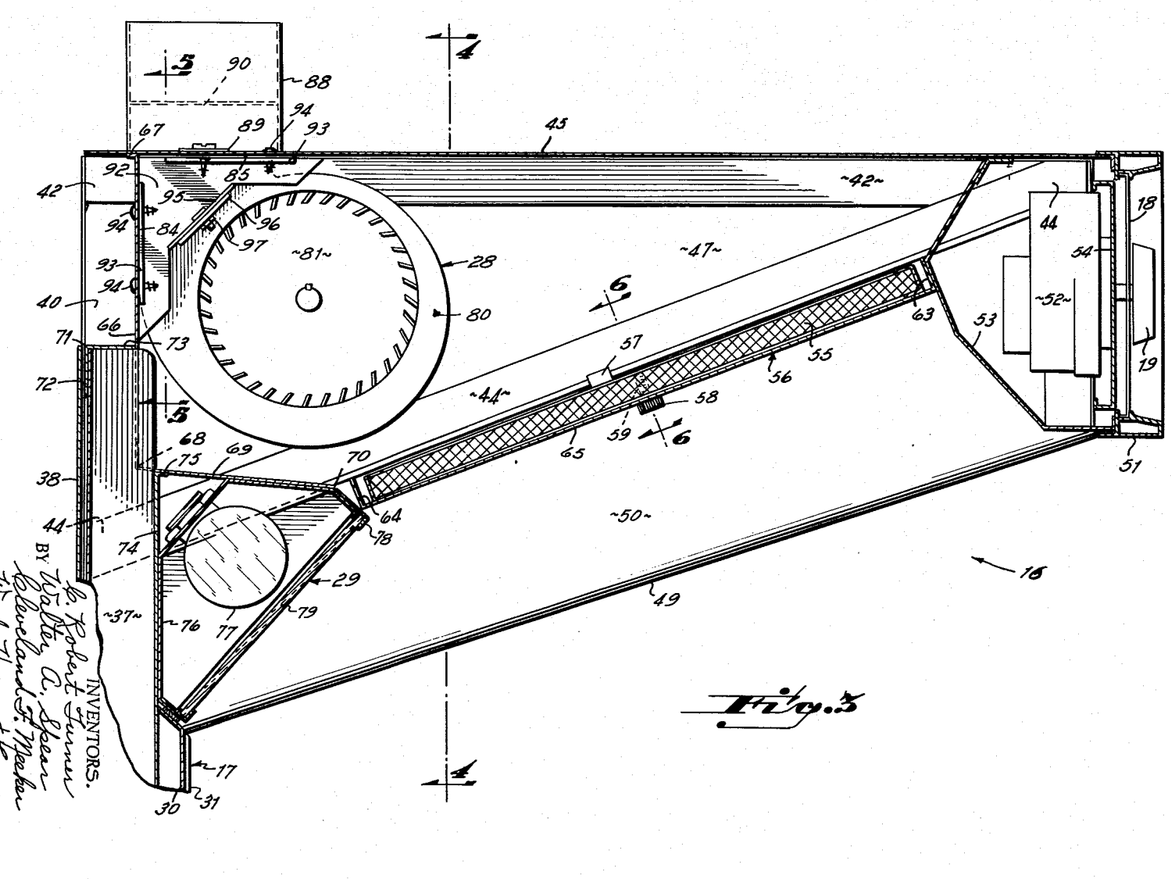
FIGURE 5 is a fragmentary cross sectional view taken on the line 5—5 of FIGURE 3.
Figure 6:
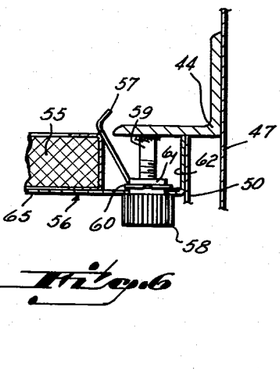
FIGURE 6 is a fragmentary cross sectional view taken on the line 6—6 of FIGURE 3.

The details of the construction of the upper portion of the burner unit are best illustrated in FIGURES 3 through 6. Referring first to FIGURE 4, the frame includes vertical right angular frame members 39 and 40 which are at the two sides of the burner unit and which extend from the lower portion of the burner unit, being tied into the frame 36. At the top of the rear part of the hood, frame members 39 and 40 are tied into horizontal, right angular frame members 41 and 42 which extend along the two sides of the hood at the top thereof. The vertical frame members 39 and 40 are tied to the forward ends of the horizontal frame members 41 and 42 by means of angularly disposed, right angular frame members 43 and 44 that are angled such that they extend downwardly and rearwardly from the forward ends of the horizontally disposed frame members 41 and 42, see FIGURE 3. As shown in FIGURE 4, the top of the hood is enclosed by a top panel 45 which is fastened to the horizontal frame members 41 and 42. The sides of the hood are enclosed by side panels 46 and 47 which are angulated sloping upwardly from the rear of the burner unit toward the front where they tie into the control panel assembly to be described later. The upper edges of side panels 46 and 47 are turned over at right angles toward one another to provide flanges 48—48 that are affixed to the frame members by means of metal screws, the flanges overlying the edges of top panel 45. The lower portions of the two side panels 46 and 47 are doubled inwardly upon themselves as at 49 to provide lower rounded edges. The doubled over parts of the side panels as at 50—50 are spaced slightly from the outer parts of the side panels 46 and 47 and the upper edges of these inner walls within the doubled over areas of the two side panels extend upwardly to terminate at a straight edge that is immediately underneath the two flanges of the sloping angle members 43 and 44 of the frame. The inner walls 50—50 of the turned over lower portion of the hood therefor provide a finished surface for the inside of the hood.

Referring again to FIGURE 3, the control panel 18 may be seen at the right, this panel being enclosed within a decorative frame 51 that is fastened to the forward ends of the top panel 45 and the side walls 46 and 47 of the hood. In back of the control panel 18, switches such as the one shown at 52 are provided, one for each control knob. These switches are enclosed within a separator wall 53 which defines a compartment for the switches, controls, timers etc. and their associated wiring. The wall 53 preferably is configurated as may best be seen in FIGURE 3 to present a concave surface forwardly, this configuration being dependent upon the types of switches used, keeping in mind the need for compactness at this place in the hood construction. The significant point to the construction is that all of the control knobs, timers, etc. are exposed at the front of the hood where they are at eye level and best placed for safeness and availability. Further, all wiring associated with the controls is immediately available for servicing by removing the frame 51 and the control panel 18, because when this is done the switches can be tipped forwardly. Preferably, as shown, a frame member 54, to which all switches, timers etc. are secured is provided to form a subassembly for the control group.

A metal mesh grease filter 55 of conventional construction is provided for the hood. This grease filter is mounted within a tray 56. The tray is rectangular, as is the grease filter, but it is slightly wider and longer than the grease filter and the grease filter is held in a centered position within the tray by means of spring clips 57 which are fastened to the inside, side edges of the tray, see FIGURE 6. The tray 56 with the grease filter therein is held up inside of the hood by means of thumb nuts 58 which are adapted to be threaded onto studs 59 that are fastened to the angulated frame members 43—44 as by welding. It is preferred that the thumb nuts be permanently fastened to the tray by means of a split ring 60 that is engaged in a groove in a collar 61 on each thumb nut, the split ring being larger in diameter than the hole in the tray through which the collar 61 projects. It is preferred that the tray be dimensioned such that its side walls 62—62 abut the inner walls 50 of the doubled-over areas of the hood. It is also preferred that the forward wall 63 of the tray abut the back of the compartment 53 for the controls. At the rear, the wall 64 of the tray abuts a part of the light, as will be explained, so that leakage around the filter is minimized.

The bottom 65 of the tray is perforated as shown in FIGURES 1 and 20 for the passage of air. As shown, a pattern of rectangular perforations is utilized although this specific pattern and shape is unimportant. It does however provide a flat surface, although perforated, which can be wiped clean by the housewife. In addition, it adds to the appearance of the range, because it hides the filter which is likely to become discolored through use. It will be seen therefore that the tray-filter assembly provides a unit that can be removed very readily by an unskilled person by loosening the thumb nuts 58 and once removed, the filter, which is washable, may be taken to the sink and thoroughly cleansed along with the tray, then dried and put back in place.

The back of the hood is enclosed by a vertical wall 66 having a flange 67 at the top thereof that immediately underlies the top panel 45 of the hood. The vertical wall 66 drops downwardly to a bend designated 68, see FIGURE 3, that is substantially below the upper end of the duct 37, and it then continues forwardly as a shelf or wall 69 which slopes toward the front of the hood, terminating at an edge 70 that is just to the rear of the rear wall 64 of the tray 56. The vertical wall 66 and the sloping wall 69 may be appropriately flanged and connectionally secured to the frame members at the two sides of hood.

An additional horizontal frame member 71 is provided across the back of the hood, this frame member being right angular in cross section to provide a vertical flange 72 at the rear of the range to which the rear wall of duct 37 may be secured as by screws. The horizontal flange 73 of the right angular frame member 71 provides a cover for the upper end of duct 37. In the area of wall 66 and the rear part of wall 69 where the upper end of duct 37 is located, the walls 66 and 69 are cut out and the forward side wall of duct 37 terminates so that an opening is provided from the duct into the area of the hood above the filter. Just below the cut out area of the duct, the front wall 74 is turned over to provide a small flange 75 which abuts the underside of the wall 69.

A reflector-housing 76 is mounted in the angle between the front wall 74 of duct 37 and the underside of wall 69. The reflector-housing is angulated to fit exactly into the space between the walls as best may be seen in FIGURE 3. Conventional light bulbs such as the one shown at 77 may be employed for illumination or a fluorescent tube may be used which extends from one end of the reflector-housing to the other. In either case, the front of the reflector-housing 76 is enclosed by a frame 78 in which a frosted glass panel 79 is carried. The lamps or tube preferably are controlled by a button which is mounted upon contol panel 18, this making it unnecessary for anyone desiring to turn them on or off to reach across hot burners or hot pans on the burners.

Reference is now made to FIGURE 4. The blower 28 is of conventional design. As shown in this figure a generally cylindrical housing 80 is provided that is divided into three sections 81, 82 and 83 respectively. Sections 81 and 83 house squirrel cage blowers whereas the middle section, designated 82, houses an electrical motor having shafts projecting from its respective opposite ends to which are keyed the blowers. The housing is generally volute shaped as viewed from the end, see FIGURE 3. The volute shape of the housing provides a flat area 84 adjacent to the exhaust end 85 thereof and as may be seen in FIGURE 5 this flat part of the housing has an opening 86 therein through which air is drawn over the motor to cool it. The blower is adapted to be mounted in any one of three ways in the hood. As shown in FIGURE 3 the flat area 84 of the blower housing is against the rear wall 66 of the hood. In this position the opening 86 in the flat part of the housing is in alignment with an opening 87 that is cut through back wall 66. The exhaust end 85 in this instance projects in the vertical direction and a duct connector 88 is mounted on top of the top panel 45 of the hood. Flanges 89—89 at the two ends of the duct connector receive metal screws which fasten the connector in place atop the hood. It will be noted from FIGURES 3 and 4 that the lower central area of the duct connector 88 has a box 90 formed therein, which box forms an air passageway extending cross-wise of the duct. The passageway formed by box 90 is in alignment with an opening 91 cut in the top panel 45 (a knock-out plate may be employed) so that cooling air for the motor can get into the blower housing from the top in the event the back opening 87 is blocked by a wall.

The motor is held in the position shown in FIGURE 3 by means of angle brackets 92—92. These angle brackets are disposed at the respective opposite ends of the blower housing and in each instance flanges 93—93 on the brackets are secured respectively to back wall 66 and top panel 45 by means of metal screws 94. A third flange 95 on each bracket 92 is turned over at 45 degrees to the flanges 93—93 in spaced relationship such that it is adapted to seat a flange 96 which projects from the adjacent end of the blower housing. In this instance, the flanges 95 and 96 are bolted together as shown at 97.

In a second position for the blower housing, the exhaust end 85 is directed horizontally toward the rear of the hood. In this instance, the flat area 84 of the blower housing resides up against the undersurface of top panel 45 and the opening therein is in alignment with the opening 91 in the top panel 45. And it will be observed from comparing FIGURES 3 and 7 that the 45 degree angular relationship of flanges 95—95 and their position permit them again to seat the flanges 96—96 on the blower housing, so that the flanges can be bolted together as shown at 97 in FIGURE 7. In this case, the duct connector 88 is fastened to the rear face of vertical wall 66.

Figures 7, 9:
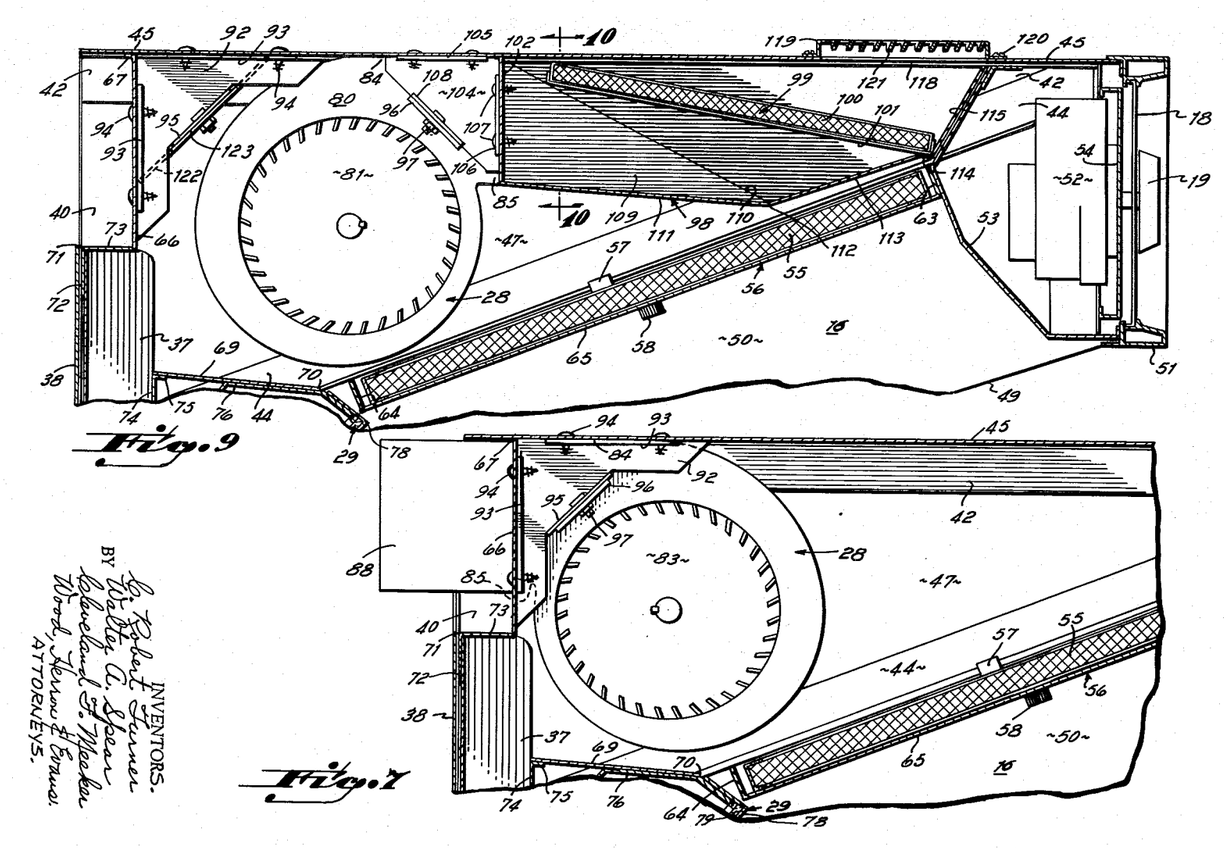
FIGURE 7 is a fragmentary cross sectional view showing the blower unit arranged to exhaust air horizontally into ductwork at the rear of the range.
FIGURE 9 is a fragmentary cross sectional view showing the blower arranged to direct air through filters in the manifold of FIGURE 8.
Figure 8:
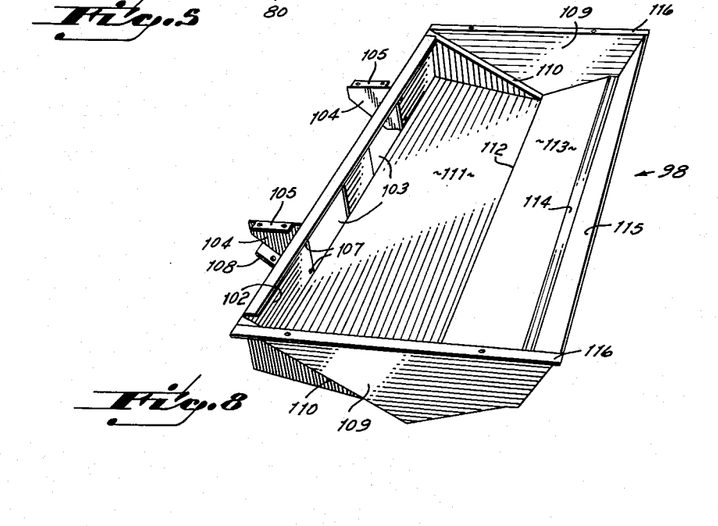
FIGURE 8 is a perspective view illustrating a manifold adapted to receive filters for a non-ducted exhaust system in which cleansed air is returned to the kitchen.

In a third position for the blower, it is mounted with its exhaust end 85 and projecting forwardly. This is for non-ducted operation and is shown in FIGURE 9. In this instance, the blower is used in conjunction with a filter assembly that includes a manifold 98, which is essentially in the form of a tray, and a double filter 99 that comprises a layer 100 of activated charcoal and a fiber smoke filter 101. It is preferred that the smoke filter 101 be upstream of the charcoal filter to prolong the life of the latter filter. The shape of the manifold tray 98 is best seen in FIGURE 8. It includes a back wall 102 that has two openings 103—103 which match the exhaust openings in the blower housing. Two angle brackets 104—104 are provided to support the blower. Each angle bracket has a flange 105 at the top thereof adapted to be fastened to the underside of the top panel 45. Each bracket also has another flange 106 adapted to be fastened by means of metal screws 107 to the rear wall 102 of the tray 98. Each bracket also has a third flange 108 on it disposed at a 45 degree angle that corresponds to a flange 95 of an angle bracket 92. Thus, the flanges 108—108 of the two brackets may seat the flanges 96—96 at the opposite ends of the blower housing and the two flanges be bolted together as at 97. In this instance, the flat area 84 of the blower housing is up against the underside of top panel 45 and an opening (not shown) in this panel, which may be in the form of a knock-out, is provided for the entry of cooling air into the housing for the motor.

Figure 10:
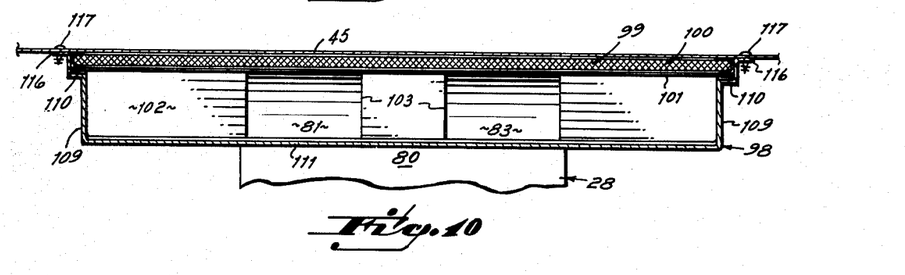
FIGURE 10 is a fragmentary cross sectional view taken on the line 10—10 of FIGURE 9.

The tray 98 has end walls 109—109 that are configurated to provide ramps 110—110 that slope from a low point in the bottom of the tray upwardly toward the top of rear wall 102. The bottom wall of the tray is divided into a rear portion 111 that slopes generally downwardly to a bend 112 and a forward portion 113 that slopes generally upwardly to a shelf 114. The front wall 115 is a continuation of the lower wall up beyond shelf 114. The two end walls 109—109 have flanges 116—116 turned outwardly from their upper edges and these flanges engage the underside of top panel 45 and are bolted thereto by metal screws as shown at 117—117 in FIGURE 10. The filter assembly 99 is sufficiently long to span and fill the space between the two end walls 109—109 above the ramps 110—110. When installed, as shown in FIGURE 9, the rear edge of the filter assembly, at the ends thereof, rest upon the ramps and the forward edge of the assembly rests upon the shelf 114. An opening 118 is provided in the top panel 45 and a louvered cover 119, in the form of an inverted tray, encloses the opening. This cover preferably is flanged and secured to top panel 45 by metal screws 120—120. It is preferred that the louvers in the cover be formed by striking downwardly stripes of metal as shown at 121 such that the strips serve as deflectors to direct air being exhausted through opening 118 forwardly and upwardly away from any overhead cabinetry. It is contemplated that such cabinetry will be used, and toward this end, the louvered cover 119 is set sufficiently far forward on top of the hood to clear the front ends of overhead cabinets of standard sizes.

When installed as shown in FIGURE 9, the manifold tray 98 substantially fills the area in the upper portion of the hood to the rear of the control compartment formed by the angulated wall 53. The sloping nature of the rear portion 111 of the botom of the manifold tray provides clearance in the area above the grease filter 55. It is further to be noted that there is sufficient width from front to back in opening 118 to provide for the removal and placement of the filter assembly 99 when louvered cover 119 is removed. During the installation of the filter assembly through opening 118, the assembly is tilted downwardly toward the rear and moved in until the rear edge of the assembly strikes the ramp. Continued inward movement causes the rear edge of the assembly to ride up the ramp until the assembly is entirely inside of the manifold tray with the forward edge resting upon shelf 114 as shown in FIGURE 8.

As part of the non-ducted kit it is preferred that a plate 122 be provided to fill the space between the two angle brackets 92—92 and thereby close the openings that are provided for vertical and horizontal exhausts. This plate 122 is provided with tabs 123 at its opposite ends which seat against the flanges 95 on the angle brackets 92 being bolted thereto as in the case of the flanges 96 on the opposite ends of the housing of blower 28.

It may be seen therefore, that the hood is adapted for a ducted exhaust that is directed vertically upwardly from the rear end thereof, or a ducted exhaust that is directed horizontally from the rear thereof, or that it can be adapted very readily through the provision of the non-ducted kit for an operation in which cleansed air is returned to the kitchen after having passed through the filter assembly 99 within manifold tray 98. It is contemplated in the latter operation that the filter assembly be replaced entirely once it has become fouled through prolonged use, because of the difficulties on the part of an average housewife of regenerating the active charcoal part of this assembly and of cleansing the smoke filter part of this assembly. However, easy access is provided for this replacement, requiring only the removal of the metal screws 120 which is well within the skill of the average housewife.

*The oven unit*

The oven itself, with one important exception to be noted later, follows conventional construction in that it is box-like in configuration having a bottom wall 124, a top wall 125, a rear wall 126 and side walls 127—127. Conventional racks (not shown) may be provided and means to place these racks in different elevations may be provided and the racks may be arranged, if desired, to slide in and out. In addition, electrical heating elements of the type shown diagrammatically only at 128—128 may be provided in the lower part and in the upper part of the oven. All walls of the oven are adequately insulated as is readily apparent from FIGURE 2. A front door 129 is provided for the oven and it may be hinged in the conventional way with a seal of the type shown at 130 provided for the top and two sides. It is important, however, in the present construction that no seal be used at the bottom of the door in order that a passageway 131 may be provided between the lower edge of the door and the face bottom wall 124 of the oven.

Figure 12:
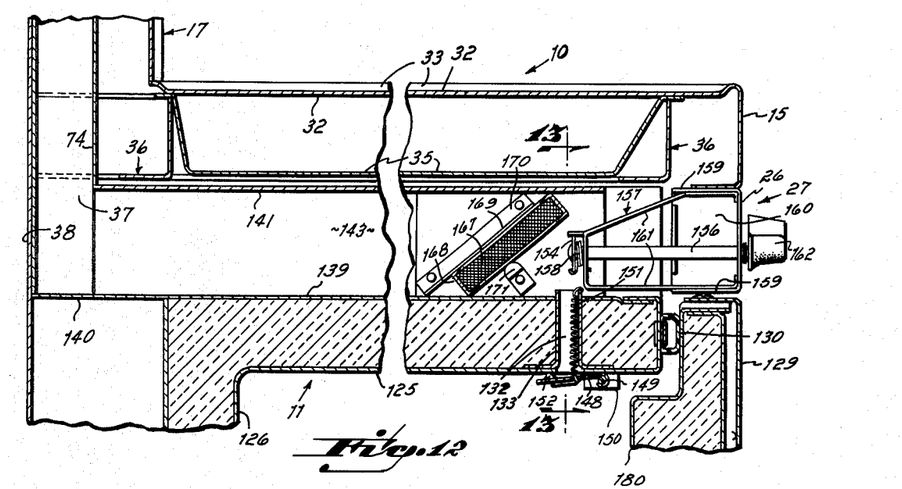
FIGURE 12 is a fragmentary cross sectional view taken on the line 12—12 of FIGURE 11 illustrating the oven vent mechanism conditioned for baking.

The important conception in the construction of the oven itself to which reference has been made is in the provision of an air passageway that takes the form of an elongated slot 132 that extends through the upper wall 125 of the oven adjacent to its forward edge. This slot is lined as shown in FIGURE 12 by a sleeve 133 so that the opening does not become fouled by the insulation material in upper wall 125.

Figure 21:
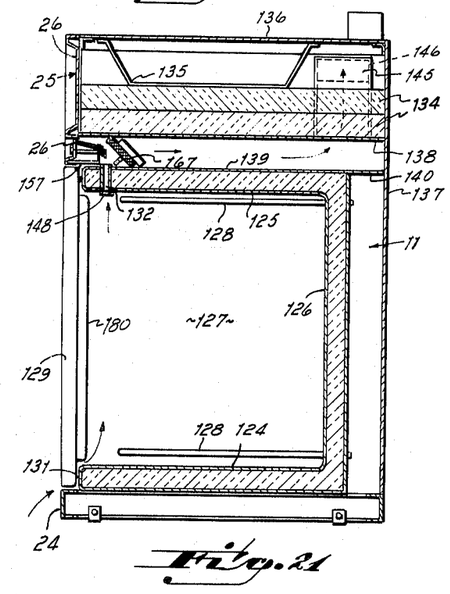
FIGURE 21 is a cross sectional view taken on the line 21—21 of FIGURE 20.
Figure 22:
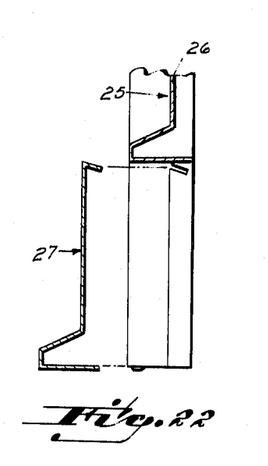
FIGURE 22 is a fragmentary cross sectional view taken on the line 22—22 of FIGURE 20.

Although the oven unit as it appears in FIGURE 1 seems to differ from the oven unit as it appears in FIGURE 20, these two units are identical insofar as their essential features are concerned, these being the features with which the invention is concerned. As stated previously, the drawer 23 of the oven unit of FIGURE 1 follows conventional constructions and it is believed unnecessary to describe it in greater detail here. The filler 24 of the oven unit as it appears in FIGURE 20 is essentially a shallow rectangular box made following range manufacturing techniques that are well known. The area behind the front panel 26 at the upper end of the oven unit, as it appears in FIGURE 20, is essentially again a rectangular box in which two bats 134—134 of insulating material are placed, being held in position by means of a metal strap 135 bent into the configuration shown in FIGURE 21 to constitute a hold-down device, the primary function of which is to prevent shifting of the bats during shipment. More specifically, the area behind front panel 26 comprises a top panel 136 which may be of any metallic material having a finished surface for the sake of appearance. A cover sheet 137 is provided to enclose the back of the compartment and this cover sheet, as shown in FIGURE 21, may extend the full depth of the oven unit. The bottom of the area is enclosed by means of a panel 138 which is affixed to conventional side walls following the usual practices in range construction. If it is desired to use the area as a warming oven, the bats of insulating material and their hold-down device may be removed. Under these circumstances a hinge may be provided either at the top or the bottom of front panel 26 and a handle of conventional design employed to facilitate the operation of the door thus formed.

Figure 11:
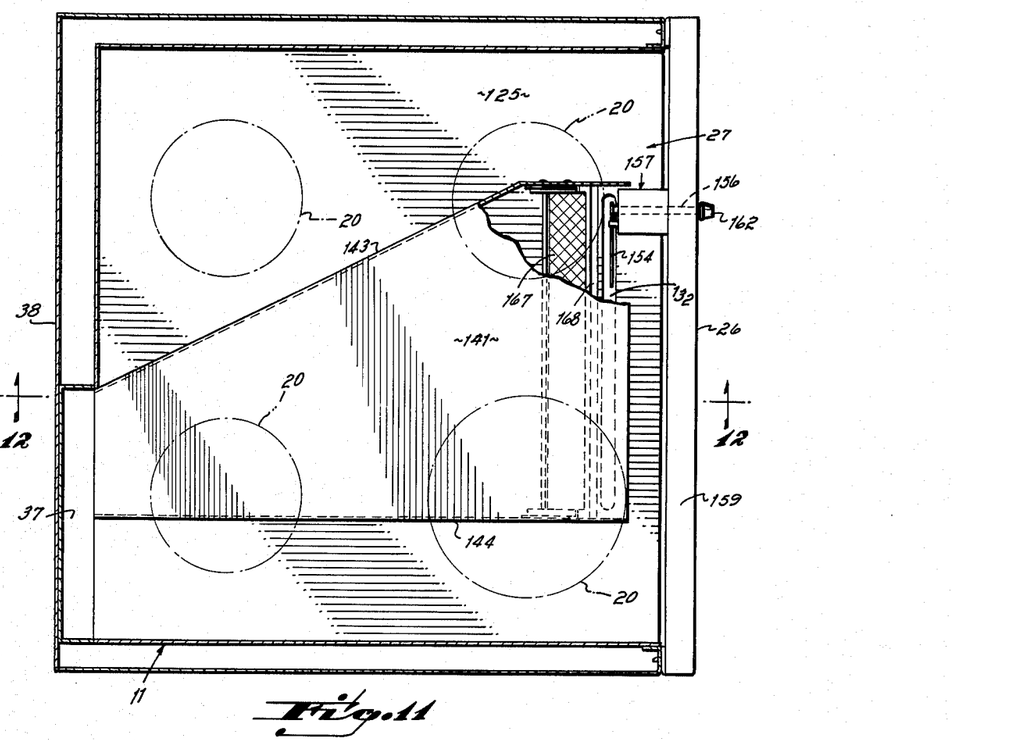
FIGURE 11 is a cross sectional view taken on the line 11—11 of FIGURE 2.

The important consideration is the compartment provided immediately above the top wall 125 of the oven, this compartment being defined by a panel 139 which constitutes the upper surface of top wall 125 of the oven, plus an extension at the rear thereof designated 140 which goes back to the back cover plate 137 in FIGURE 21 or 38 in FIGURE 2 to seal off the area below extension 140. The walls 138 and 139 find their counterparts in the oven unit of FIGURE 1 as indicated at 139 and 140 in FIGURE 2, plus the upper wall 141 of a duct which is best shown in FIGURE 11, wall 141 corresponding functionally to the wall 138 of the oven as it appears in FIGURE 21. More specifically, the duct of the embodiment of the oven of FIGURE 1 and as it appears in FIGURE 11 comprises an angulated side wall 143 at the right and a straight side wall 144 at the left. These two walls with the upper wall 141 define a duct that leads from an area immediately above the elongated slot 132 to a point of communication at the rear of the oven unit with the vertical duct 37 which in the lower area thereof has the front wall 74 cut out to provide passageway for air from the space immediately above the oven unit itself, up through the back structure and into the hood in the area thereof above filter 55.

In the case of the oven unit of FIGURE 20, and references made specifically to FIGURE 21, a duct 145 opens the compartment above the oven unit itself into the hood above the filter unit, entrance into the hood being made through an opening 146 which passes through the oven wall of the hood at the side thereof upon which the oven is mounted, in the instance of FIGURE 20 this being to the right side. This opening 146 may be of the knockout variety with one being provided at the left side of the hood and one being provided at the right side of the hood to accommodate the two different types of eye-level oven installations that are possible following the teachings of this invention. Of course, the position of the duct 145 must be shifted depending upon the side of the burning unit that the oven unit is located.

Figure 13:
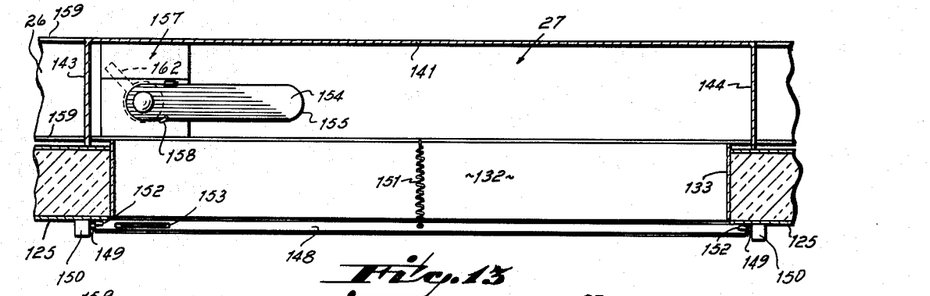
FIGURE 13 is a cross sectional view taken on the line 13—13 of FIGURE 12.
Figure 14:
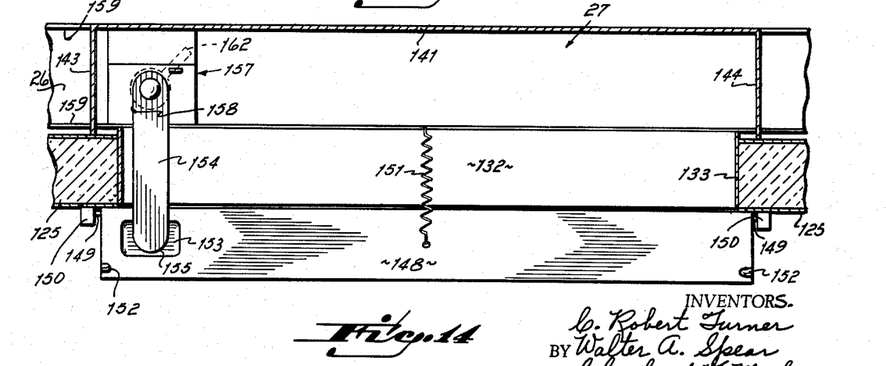
FIGURE 14 is a view similar to FIGURE 13 showing a part of the oven vent mechanism conditioned for closed-door broiling.

The slot 132, as best may be seen in FIGURE 11, is slightly longer than one-half of the distance between the side walls of the oven. The bottom opening of slot 132 is adapted to be alternatively semi-closed or fully open by means of a valve or flap 148. The forward end of this flap is curled around a hinge pin 149 and the opposite ends of this hinge pin are mounted in brackets 150—150 that depend from the underside of the upper wall 125 within the oven just forwardly of slot 132. A coil spring 151 has its lower end fastened to the center of flap 148 and has its upper end hooked over the sleeve 133 above wall 139, and this spring tends to hold the flap in a semi-closed position in which the flow of air therethrough is restricted. This semi-closed position constitutes a baking condition for the oven and the flap is held in the semi-open condition by means of two dimples 152—152 which are struck upwardly from the opposite ends of the flap as may best be seen in FIGURE 14. The dimples contact the underside of upper wall 125 of the oven and prevent the flap from sealing the slot 132. This slight opening of the flap provides sufficient ventilation for good baking within the oven and it takes the place of the usual opening found in an oven that communicates with the area beneath one of the burners. The flap has a depression 153 formed in it adjacent to one edge thereof that constitutes a detent in cooperation with a lever 154 that is adapted to hold the flap in its fully opened position as shown in FIGURE 14. The lower end of the lever 154 is rounded as at 155 and the lever itself depends through the slot 132 from the inner end of an operating shaft 156. The inner end of shaft 156 is journalled in a mount bracket 157, and a coil spring 158, that is wrapped around the inner end of shaft 156 just in front of the lever 154, is arranged such that it tends to swing the lever into the horizontal position shown in FIGURE 13. The forward end of shaft 156 is journalled in and projects through a bore in the front panel 26. As shown, the front panel 26 has inwardly extending walls 159—159 at the respective upper and lower edges thereof and in addition has end walls turned inwardly as shown at 160 to provide a box-like, rigid structure. The mount bracket 157 for the inner end of the shaft 156 includes two arms 161—161 which are respectively fastened as by welding to the inner surfaces of the two inturned walls 159—159 of the cover plate 26. The outer end of the shaft 156 carries a control knob 162 that may be used for turning the lever 154 from the horizontal position shown in FIGURE 13 to the vertical position shown in FIGURE 14. However, the coil spring 158 tends to turn the shaft 156 into the horizontal position and it is only as a result of providing the depression or detent 153 within the flap 148 that the lower rounded end 155 of lever 154 has a stable position when it is in the vertical position. As shown in FIGURES 1 and 20 appropriate indicia are provided on the face of the panel 27 to indicate the two effective positions of control knob 162.

The primary reason for providing the coil spring 158 is to insure that the lever 154 is in its horizontal position and out of the way of the slot 132 when it is necessary to remove front panel 26 to provide access to a filter 167 that is mounted within the space provided between upper and lower walls 138 and 139 which, with the side walls of the oven unit, define the compartment through which contaminated air passes from the oven into the duct 145 and then through the opening 146 into the area of the hood above the filter 55 under the action of the blower 28. Filter 167 is a grease filter and it comprises a conventional frame 168 in which is enclosed a washable metal mesh pad. This filter resides in an angulated position within the space between walls 138 and 139 with its ends resting against a flange 169 of a right angular bracket 170 that may be fastened by means such as rivets to the opposite side walls of the oven unit, or as in the case of the embodiment of the invention illustrated in FIGURES 1 and 11, against the side walls 143–144 of the duct work provided therein. The filter is held against the flange 169 by means of leaf springs 171 past which the opposite ends of the filter may be pushed to reside against the flange 169. Thus, in order to remove the filter 167 to clean it, the front panel 26 is pulled from its position, this taking the shaft 156 and its associated lever 159 with it, and the two leaf springs 171 are depressed and the filter 167 removed through the open front of the oven unit. In order to replace the cleansed filter the procedure is reversed.

Therefore, it may be seen that all air coming from the oven during a baking period, when the flap 148 is in the semi-open position shown in FIGURE 12, must pass through the grease filter 167 before it can enter the compartment between upper and lower walls 138, 139, and passed from this area into the duct 37, as in the case of the embodiment of FIGURES 1, 2 and 11, or, as in the case of the embodiment of FIGURES 20 and 21, into the duct 145 before passing through blower 28. In both instances, the air getting to the blower from the oven has been filtered to remove grease particles, and this is especially important in closed-door broiling.

Obviously the duct that is utilized in the embodiment of FIGURE 1 is merely a means of confining the direction of the hot gasses that arise from the operation of the oven so that they are not permitted to spread into the entire area directly beneath the burners in an installation where the oven is below the burner unit. This is primarily a matter of precaution inasmuch as high temperatures resulting from closed-door broiling might possibly adversely effect the wiring of the burners 20. Thus, it is recommended that the duct be employed and that wiring for those two burners at the left be at the left side of the duct and wiring for those two burners at the right of the duct be at the right side of the duct.

Figures 16, 17:
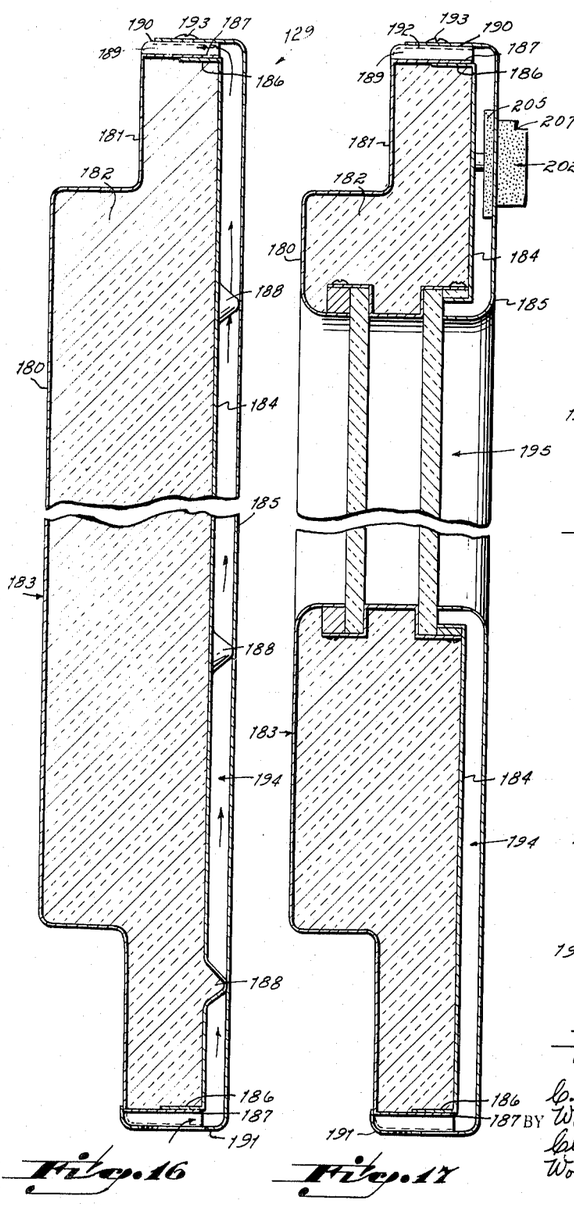
FIGURE 16 is a cross sectional view showing a preferred oven door construction in which no window is employed.
FIGURE 17 is a view similar to FIGURE 16 illustrating a door having a window therein.
Figure 18:
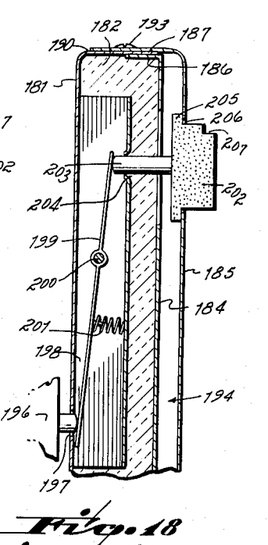
FIGURE 18 is a fragmentary cross sectional view illustrating the preferred embodiment of a switch for turning on a light inside of the oven.

Reference is now made to FIGURES 16 and 17 which show cross-sectional views of a preferred embodiment of the oven door. Following conventional practices, that area of the door indicated at 180 that is actually within the forward area of the oven when the door is in closed position is substantially thicker than the marginal area of the door designated by the numeral 181. Preferably the door is filled with insulation material, as indicated at 182, and this insulation material is confined between a rear panel 183 and an intermediate panel 184 that is not exposed to the front of the oven door but is hidden behind a decorative covering panel 185. The intermediate panel 184 has its four edges turned inwardly as shown at 186 and these inturned edges nest within out-turned edges 187 of the rear panel 183.

Figure 15:
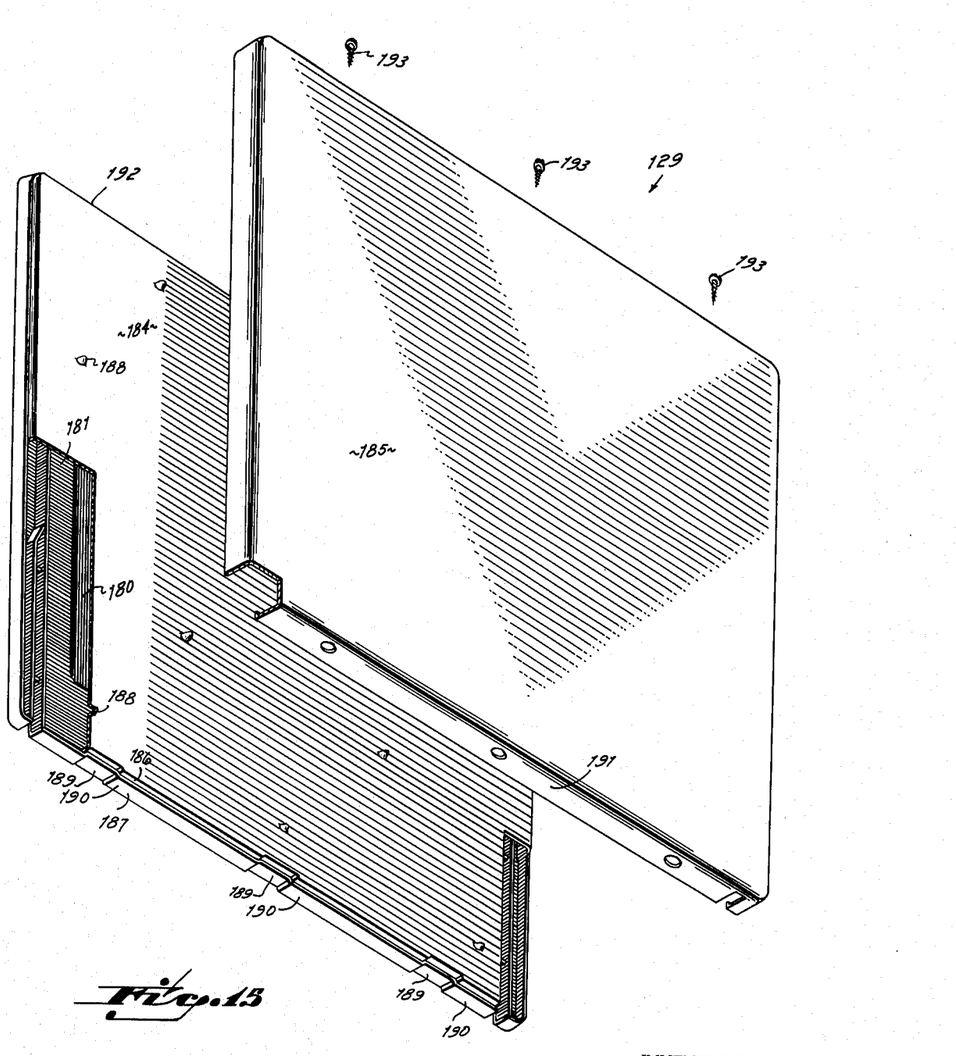
FIGURE 15 is an exploded view showing a preferred construction of a door for the oven.

The rear panel 183, the confined insulation material 182 and the intermediate panel 184 actually define an operable door, but the outer, covering panel 185 is provided for two reasons that will now be explained. The outer covering panel 185 is spaced from the intermediate panel 184 by means of a series of protuberances 188 that are in the form of dimples pressed outwardly from intermediate panel 184. In addition, the bottom edge of the door, as provided by the two panels 183 and 184 and the confined insulation material, has its upper and lower edges configurated to provide a series of notches 189 as best may be seen in FIGURE 15. The land areas 190 between the depressed areas 189 provide support for the decorative outer panel 185 of the door. The outer panel 185, at the lower end of the door is turned inwardly to provide a hooked flange 191 that engages around the lower edge of the door proper. At the upper end, the decorative panel is turned over at a right angle to provide a flange 192 that engages over top of the door and the flange is fastened by means of the handle. It may be seen, therefore, that a passageway, designated generally by the numeral 194, is provided for air to enter into the space between the intermediate panel 184 and the outer, decorative panel 185 and to rise and exit at the top, passing into the area above the oven in which the filter 167 is located. Thus, the decorative panel of the door is cooled by this passage of air.

In a combination such as disclosed here, wherein a single burner unit may be utilized in at least three different arrangements with an oven unit, the range may be shipped to a dealer without the outer decorative panel 185 attached and a series of outer decorative panels 185 may be carried in stock by the dealer. The dealer, by selecting outer decorative panels of different colors from his inventory, is able to satisfy the color demands of many of his customers, and he may do this without carrying a large inventory of ranges.

The door shown in FIGURE 17 is essentially like that shown in FIGURE 16, however in this instance, following conventional practices, a double glass window, indicated generally at 195, is installed in the center of the front of the door. When a door having a window therein is used for the oven unit it is preferred that a light, not shown, be employed inside of the oven and that provision be made to turn on this light from the outside of the oven without opening the door. This light may be of the type used in conventional ovens. In the conventional installation, a switch is employed that has a plunger associated with it that is contacted whenever the oven door is closed and this contact causes the light to be turned off. When the door is opened the plunger extends under the action of a spring and the light goes on. In the present case, a conventional plunger type switch 196 is employed, but this plunger projects through a hole 197 that is made in the door through the panel 184. A channel member 198 in the area behind the hole 197 provides a space for a lever 199 that is pivotally mounted on a pin as shown at 200. Normally a coil spring 201, that is disposed between the lower portion of the lever 199 and the bottom of the channel member 198, urges the lever in the direction such that its lower end is just inside of the hole 197, and when the door is swung closed the lever, under the action of coil spring 201, causes the plunger to be depressed to turn out the light. Under these conditions the operation of the light within the oven is as in conventional ovens, the light comes on when the door is open and it goes out when the door is closed. For this type of operation, the coil spring 201 must be sufficiently strong to overcome the spring tending to extend the plunger of switch 196.

Figure 19:
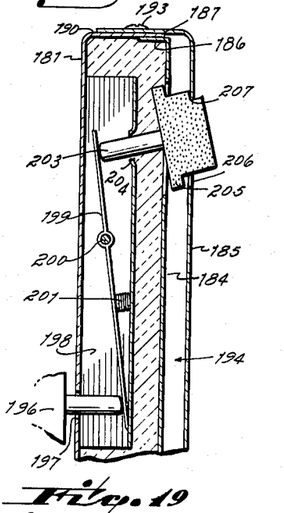
FIGURE 19 is a view similar to FIGURE 18 showing the switch mechanism in "on" condition.

However, when it is desired to turn on the light within the oven without opening the door a push button 202 is employed. This push button carries a plunger 203 at its inner end that projects through a bore 204 through the door and through the bottom of the channel member 198 and into contact with the upper end of the lever 199. It may be seen therefore that when the push button is depressed the lever is swung into the position shown in FIGURE 19 which permits the spring urged plunger 196 to swing out into the on position. The push button 202, which may be made of plastic material is square in outline and it has a base 205 which is larger than the push button itself and this base makes contact with the decorative wall 185 surrounding a square opening 206 in decorative panel 185 through which the button projects. In addition, the button has a notch 207 in its upper edge which may be brought into contact with the exposed edge of the opening 206 to lock the button in its depressed position as shown in FIGURE 19. Therefore, when it is desired to inspect the progress of a broiling operation the button 202 may be depressed temporarily and then released or it may be depressed and then locked in the depressed condition if it is desired to have the light to continue for a long period.

Figure 23:
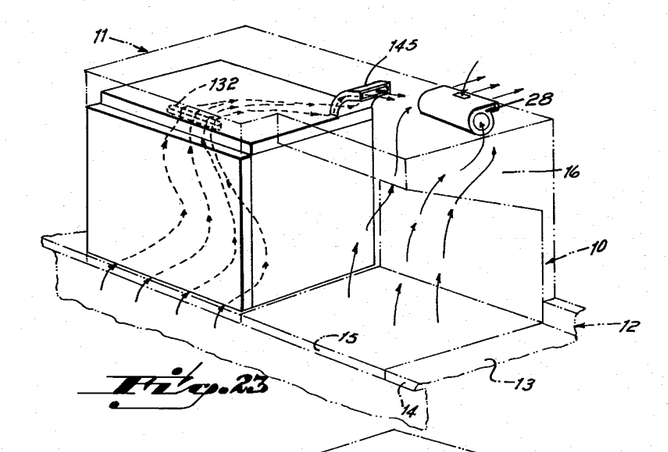
FIGURE 23 is a diagrammatic phantom view showing the flow of air through the oven and from the area above the burners, into the hood and thence horizontally out of the rear of the range. In this view, the oven unit is shown installed to the left of the burner unit.
Figure 24:
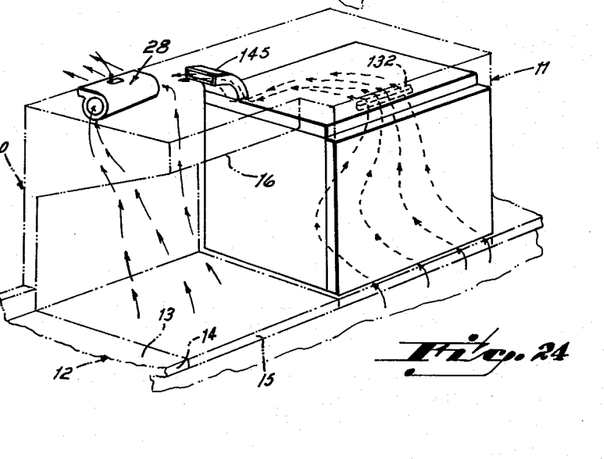
FIGURE 24 is a view similar to FIGURE 23 in which the oven unit is shown installed to the right of the burner unit.
Figure 25:
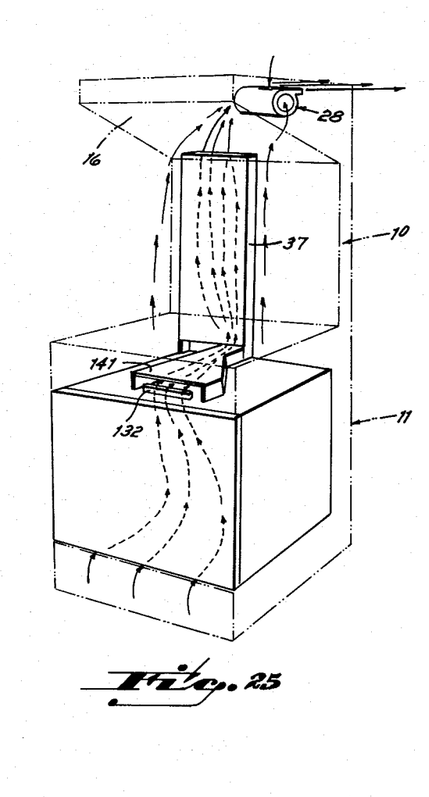
FIGURE 25 is a view similar to FIGURES 23 and 24 showing the burner unit mounted on top of the oven unit.

Reference is now made to the diagrammatic phantom views of FIGURES 23 through 25. In FIGURE 23, the oven unit 11 is shown mounted to the left of the burner unit 10. In this instance, the air passing through oven unit 11 enters as shown underneath the door and it passes up through slot 132 back through the compartment above the oven and thence, through the duct 145 into the area of the hood 16. From here it enters the blower and in the instance shown, is vented toward duct work at the rear of the range. In FIGURE 24, the relationship of the oven unit and burner unit is reversed with the oven unit being to the right. In this case, the flow pattern of air is the same as in FIGURE 23 except that the air passes from right to left in going through the duct 145. In the type installation shown in FIGURE 25 wherein the burner unit is on top of the oven unit, the air passes up through the slot 132 and then rearwardly through the duct having upper wall 141, thence, to the vertical duct 37 and into the blower 28 for discharge to the outside atmosphere. In any one of the three types of installations shown in these figures, a conversion can be made to a non-ducted operation by turning the blower around so that it discharges the air forwardly and into a manifold 98 of the type illustrated in FIGURE 9.

Having described our invention, we claim:

1. A cooking range exhaust hood comprising a vertical rear panel, a rectangular top panel the rear edge of which meets the upper edge of said rear panel at a right angle, a control panel assembly depending from the forward edgewise portion of said top panel to provide a front for said hood, side panels at the respective sides of said hood the lower edges of which slope downwardly and rearwardly from said control panel assembly to said rear panel, a grease filter, means mounting said grease filter in said hood such that it is above the sloping lower edges of said side panels and generally paralleling said lower edges whereby the space between said filter and said top panel increases going from said control panel assembly rearwardly toward said rear panel, a blower having an exhaust outlet, means to mount said blower to blow air forwardly in said hood for non-ducted operation, a tray, said tray having a rear, a bottom, a front, and side walls, means mounting said tray in said hood with the upper edges of the walls thereof in contact with the underside of said top panel and with the front wall thereof adjacent to said control panel assembly, there being an opening in the rear wall in said tray in communication with the exhaust outlet of said blower, there being an opening in said top panel adjacent to the rear of said control panel assembly whereby air blown into said tray is exhausted from the hood through said opening in said top panel, a second filter dimensioned to fit within said tray such that air passing through said tray must pass through said second filter, the opening in said upper panel being sufficiently large to permit the passage of said second filter into and out of said tray, and a removable, louvered cover for the latter opening.

2. A cooking range exhaust hood comprising a vertical rear panel, a rectangular top panel the rear edge of which meets the upper edge of said rear panel at a right angle, a control panel assembly depending from the forward edgewise portion of said top panel to provide a front for said hood, side panels at the respective sides of said hood the lower edges of which slope downwardly and rearwardly from said control panel assembly to said rear panel, a grease filter, means mounting said grease filter in said hood such that it is above the lower edges of said side panels and generally paralleling said sloping lower edges whereby the space between said filter and said top panel increases going from said control panel assembly rearwardly toward said rear panel, a blower having an exhaust outlet, means to mount said blower to blow air forwardly in said hood, for non-ducted operation, a tray, said tray having a rear, a bottom, a front, and side walls, means mounting said tray in said hood with the upper edges of the walls thereof in contact with the underside of said top panel and with the front wall thereof adjacent to said control panel assembly, there being an opening in the rear wall in said tray in communication with the exhaust outlet of said blower, there being an opening in said top panel adjacent to the rear of said control panel assembly whereby air blown into said tray is exhausted from the hood through said opening in said top panel, the opposing side walls of said tray configurated to provide forwardly and downwardly sloping ramps, the forward wall of said tray configurated to provide a shelf, a second filter dimensioned to fit within said tray sloping downwardly and forwardly with the sides of said second filter resting upon said ramps and with the front edge thereof resting upon said shelf, said opening in said upper panel being sufficiently wide to permit the passage of said second filter into and out of said tray, and a removable, louvered cover for said opening in said panel adapted to direct air exhausted therethrough upwardly and outwardly therefrom.

3. A cooking range exhaust hood comprising a vertical rear panel, a rectangular top panel the rear edge of which meets the upper edge of said rear panel at a right angle, a control panel assembly depending from the forward edgewise portion of said top panel and providing a front for said hood, side panels at the respective sides of said hood the lower edges of which slope downwardly and rearwardly from said control panel assembly to said rear panel, a grease filter, means mounting said grease filter in said hood such that it is above but adjacent the lower edges of said side panels and generally paralleling said lower edges whereby the space between said filter and said top panel increases going from said control panel assembly rearwardly toward said rear panel, a blower having an exhaust outlet, means to mount said blower to blow air forwardly in said hood for non-ducted operation, a tray, means mounting said tray in said hood above said grease filter between said control panel assembly and said blower with the rim thereof in contact with the undersurface of said upper panel, there being an opening at the rear of said tray in communication with the exhaust outlet of said blower, there being an opening in said top panel adjacent the rear of said control panel assembly whereby air blown into the rear of said tray is directed to said opening in said top panel, a second filter dimensioned to fit within said tray such that air passing through said tray must pass through second filter, and said opening in said upper panel being sufficiently large to permit the passage of said second filter into and out of said tray.

References Cited by the Examiner

UNITED STATES PATENTS

| | | | |
|---|---|---|---|
| 2,369,375 | 2/1945 | Sonntag | 98—115 |
| 2,596,874 | 5/1952 | Sonntag | 98—115 |
| 2,746,449 | 5/1956 | Pledger | 126—301 |
| 2,807,994 | 10/1957 | Bernstein | 98—115 |
| 2,886,124 | 5/1959 | Scharmer | 126—299 |
| 3,006,333 | 10/1961 | Niemann | 126—19 |
| 3,033,188 | 5/1962 | Cline et al. | 126—19 |

FOREIGN PATENTS 888,823  2/1962  Great Britain.

FREDERICK L. MATTESON, Jr., *Primary Examiner.*

JAMES W. WESTHAVER, *Examiner.*

E. G. FAVORS, *Assistant Examiner.*